United States Patent

Alvelid et al.

[11] Patent Number: 5,176,053
[45] Date of Patent: Jan. 5, 1993

[54] CUTTING TOOL EQUIPPED WITH A STATE INDICATOR

[76] Inventors: Birger Alvelid, Pianovägen 6, S-435 44 Mölnlycke; Ralph Crafoord, Skogsrydsgatan 11, S-421 74 V. Frölunda, both of Sweden

[21] Appl. No.: 543,766

[22] PCT Filed: Nov. 17, 1988

[86] PCT No.: PCT/SE88/00625
§ 371 Date: Jul. 31, 1990
§ 102(e) Date: Jul. 31, 1990

[87] PCT Pub. No.: WO90/05607
PCT Pub. Date: May 31, 1990

Related U.S. Application Data

[63] Continuation-in-part of Ser. No. 344,453, Apr. 28, 1989, Pat. No. 4,945,770, which is a continuation of Ser. No. 99,318, Aug. 11, 1987, abandoned.

Foreign Application Priority Data

Oct. 20, 1987 [SE] Sweden .................. 8704079

[51] Int. Cl.⁵ .................................. B23B 25/06
[52] U.S. Cl. ..................... 82/173; 407/120; 73/104; 374/141; 82/900
[58] Field of Search ........... 407/120; 73/104, 862.06, 73/7; 82/900, 173, 118; 340/680; 374/141, 142; 408/6, 11; 409/134, 187, 194

[56] References Cited

U.S. PATENT DOCUMENTS

| | | | |
|---|---|---|---|
| 3,079,821 | 3/1963 | Von Zelewski et al. | 82/173 |
| 4,744,241 | 5/1988 | Mayer | 407/120 |
| 4,885,530 | 12/1989 | Mayer et al. | 407/113 |
| 4,927,300 | 5/1990 | Ramalingam et al. | 407/120 |
| 4,945,770 | 8/1990 | Alvelid et al. | 73/862.06 |
| 5,000,036 | 3/1991 | Yellowley et al. | 73/104 |

FOREIGN PATENT DOCUMENTS

| | | | |
|---|---|---|---|
| 217242 | 4/1987 | European Pat. Off. | |
| 452911 | 12/1987 | Sweden | |
| 456564 | 10/1988 | Sweden | |
| 570457 | 8/1977 | U.S.S.R. | 407/120 |
| 1259272 | 1/1972 | United Kingdom | |

Primary Examiner—Larry I. Schwartz
Assistant Examiner—Kevin J. Carroll
Attorney, Agent, or Firm—Nies, Kurz, Bergert & Tamburro

[57] ABSTRACT

A cutting tool equipped with a tool state detector which comprises temperature sensors and conductors which are placed on the tool. The invention is characterized in that two or more temperature sensors (10-13) are placed on the tool (1) at mutually different distances from the tool cutting edge (3), so that the temperature distribution in the tool (1), at least at the cutting edge (3) and its immediate vicinity, can be established from electric signal emitted by the sensors (10-13), and that at least some of the sensors are so placed that one or more of the sensors will be worn away in successive sequence as the tool (1) wears. The temperature sensors (10-13) are preferably thermoelements.

9 Claims, 1 Drawing Sheet

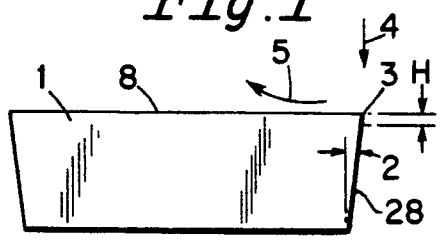
Fig.1
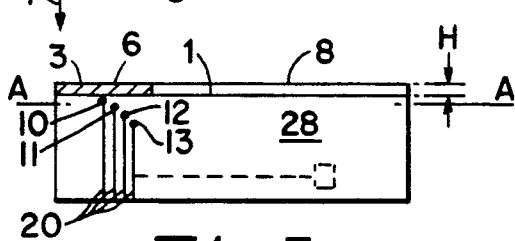
Fig.2
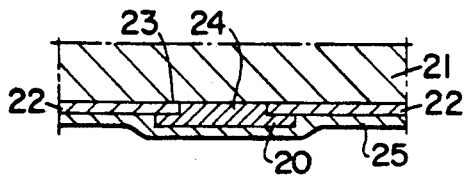
Fig.4
Fig.3
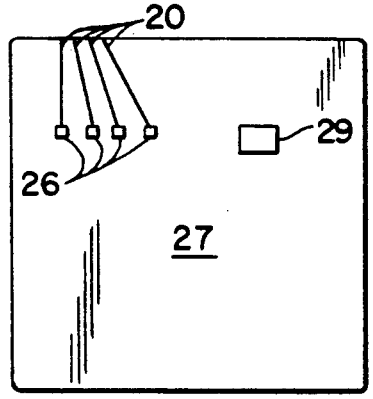
Fig.5
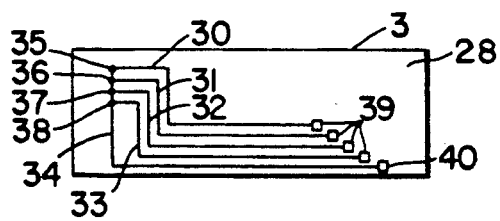
Fig.6
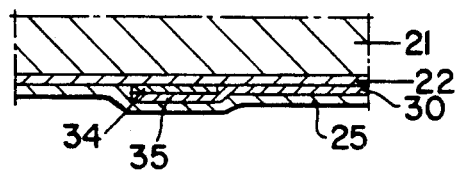
Fig.8
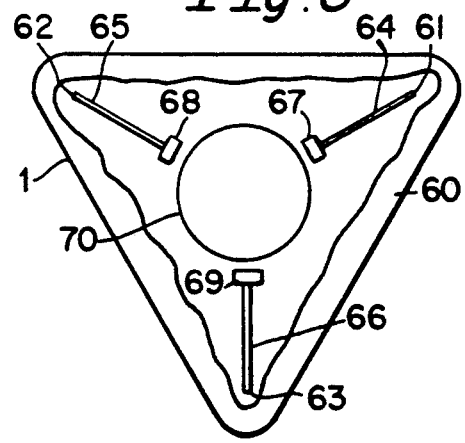
Fig.7
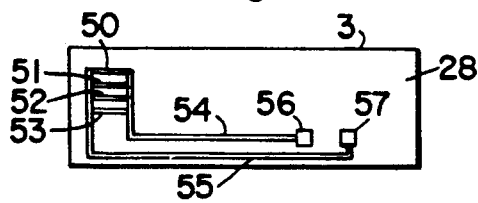
Fig.9
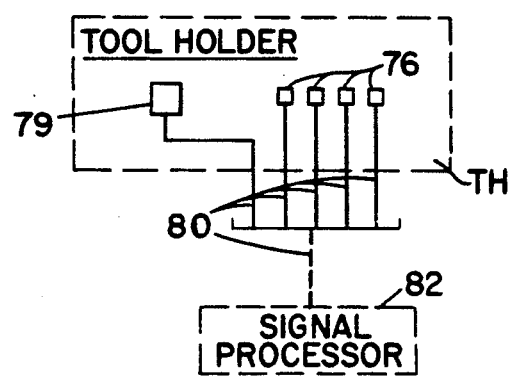

CUTTING TOOL EQUIPPED WITH A STATE INDICATOR

This application is a continuation-in-part of application Ser. No. 07/344,453, filed Apr. 28, 1989, now U.S. Pat. No. 4,945,770, issued Aug. 7, 1990, which is a continuation of Ser. No. 099,318 filed Aug. 11, 1987 now abandoned.

The present invention relates to a cutting tool equipped with a tool state indicator, and more specifically to a state indicator for measuring tool temperature and tool wear.

BACKGROUND OF THE INVENTION

The cost of a machining operation which requires the use of cutting tools is highly dependent on the wear rate of the tool. Consequently, attempts have been made in the past to measure tool wear directly, and to assess the useful length of life of a tool on the basis of tool wear, primarily on the basis of chamfer wear on the relief or clearance side of the tool. An experienced machine operator will be able to judge roughly with the naked eye whether or not the tool needs to be changed.

In present times automatization has progressed to such lengths that there is often no operator available, and consequently attempts have been made, for instance, to work with automated wear measuring methods with the use of image processing systems, which is an expensive and slow solution to the problem. It is necessary with such machines to halt machining work while the measurements are being taken. Attempts have also been made to measure tool wear indirectly, by measuring prevailing cutting forces, the changes in which forces are contingent on wear on the tool. The relationships, however, are not always specific and consequently the method is not reliable.

A third method involves measuring cutting temperatures, e.g. with the aid of a thermoelement inserted into a bore drilled in the tool. This results in mechanical weakening of the tool, however, and it is very difficult to drill holes in the extremely hard material from which such tools are made and to position the holes with precision. Tool temperatures are measured in on attempt to calculate the temperature of the cutting tool in the critical zone around the cutting edge—the contact surfaces between tool and chip or swarf and tools and workpiece respectively.

For mechanical strength reasons, it is necessary to place the thermoelement at a relatively long distance from the actual cutting edge and the temperatures measured will differ radically from the temperature which actually prevails at the contact surface and which determines the wear rate of the tool.

CROSS REFERENCE TO RELATED APPLICATION

It is disclosed in Swedish Patent Specification 8403609-4 dated Apr. 7, 1988 and from Swedish Patent Application 8403609-4 filed Jul. 6, 1984 and published on Jan. 7, 1986 under Publication No. 452,911, that a thermoelement and/or thermistor can be configured, for instance, with the aid of thin film techniques so as to measure the temperature of a spot or punctiform location on a tool or some other mechanical component.

Applicants' U.S. Pat. No. 4,945,770 dated Aug. 7, 1990 corresponds in its disclosure with Swedish Patent No. 8403609-4. The U.S. application Ser. No. 344,453 was filed 99,318, dated Aug. 11, 1987 (abandoned), and has a priority filing date of Jan. 2, 1986 based on PCT application PCT/SE86/00001 (Published as WO87/04236 on Jul. 16, 1987).

The aforesaid Swedish Patent Specification (U.S. Pat. No. 4,945,770) also discloses that tool wear can be measured successively with the aid of a plurality of conductors connected to the cutting edge, since the resistances in the conductors will change gradually and abruptly, depending on the extent to which the conductors are worn away.

SUMMARY OF THE INVENTION

It is highly desirable to be able to control a cutting process in a manner which will enable the process to be effected under optimum conditions with respect to cutting speed, feed and tool wear. However, the cutting properties of the machined material will vary from workpiece to workpiece, and even within one and the same workpiece. Consequently, when employing known techniques it is necessary to choose relevant cutting data conservatively, so that the tools are able to withstand the most difficult loading situations, which means that it is often necessary to work at excessively low cutting speeds or feeds.

It is also desired to avoid the occurrence of tool catastrophes, with the tool in engagement with the workpiece.

This desire is particularly manifest in the case of large and/or expensive workpieces.

The present invention fulfills the above mentioned objectives. It is possible with the aid of the present invention to calculate or establish the temperature distribution in a cutting tool and to obtain information relating to the extent of tool wear at any given moment in time.

This will enable an optimum cutting speed or feed to be selected at any given moment.

It is also possible by means of the invention to obtain continuously information which relates to the distribution of temperature in the tool and to the extent of wear thereon, and to calculate on the basis of this information cutting data or criteria which will enable work to be completed on the workpiece being machined without risk of a tool catastrophe. Of course, it is necessary in this respect to have available experimental data obtained from earlier machining or cutting operations. Such data however, can be accumulated readily while applying the present invention.

The present invention thus relates to a cutting tool equipped with a tool state indicator. The state indicator comprises temperature sensors and a plurality of conductors applied to the tool, and is characterized in that two or more temperature sensors are placed on the cutting tool at mutually different distances from the cutting edge of the tool, so as to enable the temperature distribution in the cutting tool, at least at the cutting edge thereof and in the immediate proximity of the edge, to be calculated from electric signals transmitted from the temperature sensors; and in that at least some of the sensors are so placed as to be worn away in sequence and progressively as the tool wears.

The invention will now be described in more detail with reference to an exemplifying embodiment thereof illustrated in the accompanying drawings, in which

BRIEF DESCRIPTION OF THE DRAWING

FIG. 1 is a side view of a flat indexable insert;

FIG. 2 illustrates the invention as applied to an indexable insert seen from the right in FIG. 1;

FIG. 3 is a bottom view of the indexable insert illustrated in FIG. 2.

FIGS. 4 and 6 are respective cross-sectional views taken through an outer part of the flat indexable insert;

FIGS. 5 and 7 are views of an indexable insert corresponding to the view of FIG. 2 and illustrating alternative embodiments of the invention;

FIG. 8 illustrates the chip breaking side of a triangular indexable insert; and

FIG. 9 is a dotted line schematic block diagram showing a tool holder with contacts, which correlate with those on the insert shown in FIG. 3, and conductors from the contacts to a signal processor.

DESCRIPTION OF THE PREFERRED EMBODIMENTS

FIGS. 1 and 2 illustrate a flat insert 1. FIG. 1 shows the insert plate from one side and illustrates a clearance angle 2 of about 6° to the right and to the left end surfaces 28 of insert plate 1 and extending downwards from the cutting edge 3. An indexable insert of this kind will initially wear so as to form a chamfer wear surface 6 (FIG. 2) having a width (H) of less than 0.1 mm. The arrows 4 illustrate the direction in which the material is advanced relative to the insert 1. The arrow 5 shows the transport direction of the chips. Such indexable inserts are very well known per se and can be made of various materials, such as hardmetal, ceramics, high-speed steel and other hard allows. They can also incorporate diamonds or boron nitrides, to greater and lesser extents.

A wear protective layer is normally applied to the base metal of the insert. This wear protective layer or antiwear layer, will preferably comprise TiN, TiC or $Al_2O_3$. Another suitable protective covering is boron nitride. The wear protective layer will have a thickness, for instance, of 0.5–50 microns.

As will be understood, the present invention relates to cutting tools in general and is thus not restricted to the cutting tools illustrated in the drawing, which solely illustrates examples of how the present invention may be applied. The cutting tools are equipped with tool state indicators comprising temperature sensors and having conductors which are mounted on the cutting tools concerned.

The conductors and/or the temperature sensors can be mounted on the tool so as to form therewith an atomically integrated unit, e.g. with the aid of PVD or CVD techniques or a photo-chemical method.

Alternatively, the conductors and/or sensors can be applied with the aid of a printing method and a subsequent sintering process. It is thus possible to use both a thick film technique and a thin film technique. Depending on the method used, the thicknesses of the conductors and temperature sensors may vary, for instance from 0.1 micron to 5.0 microns.

According to the invention, two, three or four temperature sensors 10–13 are placed on the cutting tool 1 at mutually different distances from the cutting edge 3, so that the temperature distribution in the tool, at least at the cutting edge thereof and in the near vicinity of the edge, can be calculated from electric signals transmitted from the temperature sensors. Also in accordance with the invention, at least a some of the sensors are so placed that one or more sensors will be worn away in successive sequence as the tool wears.

According to one preferred embodiment the temperature sensors have the form of thermoelements.

The width of the chamfer wear surface varies from an initial value of zero mm (0 mm) to a given width value of, e.g., up to 0.7 mm, at which the cutting tool is considered to be worn out.

According to one preferred embodiment, two or more thermoelements are placed on the clearance or relief surface 28 of the cutting tool at a distance from the cutting edge such as to be worn away with increasing wear of the wear surface of the tool.

Preferably a plurality of thermoelements are placed on the clearance surface, with at least one thermoelement placed at a greater distance from the cutting edge than the dimension corresponded by the greatest intended width of the chamfer wear surface when the tool is considered to be worn out.

The cutting tools may be made of both electrically conductive and electrically insulating material.

When the cutting tool is made of an electrically conductive material, the tool is provided with an insulating layer, e.g. a layer of $Al_2O_3$ onto which electrical conductors are applied. The layer may suitably have a thickness of 1 to 10 microns.

In the illustrated example of FIG. 2, a number of thermoelements 10–13 are placed at mutually different distances from the cutting edge 3, with the thermoelement 10 located nearest the edge being placed adjacent to or immediately beneath an initially obtained chamber wear surface 6. By "initially" is meant after a short time of use, for instance after about one minute of use.

Accordingly to a first embodiment of the invention, see FIG. 4, a conductor 20 for each thermoelements is applied to an electrically insulating layer 22 provided on the tool base material 21. Formed in the insulating layer 22 is a hole 23, in which one end 24 of the conductor 20 is brought into contact with the base material, to form a thermocouple. In this case, the cold solder location (not shown) for each thermocouple is placed at a distance from the tool, e.g. on the tool holder.

Many materials in combination form thermocouples which generate an electric voltage in accordance with the well known thermoelement principle, Seeveck effect. The invention is not limited to any particular combination of dissimilar materials. For instance, when the tool base metal is hardmetal, the conductor 20, 24 may consist of iron or platinum for example, whereas when said base metal is high-speed steel, the conductors 20, 24 may consist of gold.

The aforesaid hole 23 may, for instance, be formed with the aid of a laser, prior to applying respective conductors 20 to the cutting tool. Subsequent to applying the conductors 20, the cutting tool is preferably coated with an electrically insulating and wear protective layer 25, suitably $Al_2O_3$.

This first embodiment is illustrated in FIGS. 2 and 3, in which only one conductor 20 extends to respective thermocouples.

The contact plates 26 of each one of the respective conductors 20 may be placed on the undersurface 27 of the tool, as illustrated in FIG. 3, or may be placed on the clearance side 28 of the tool, as illustrated with a broken line in FIG. 2 for one of the conductors 20. The tool holder TH, seen in FIG. 9 has arranged thereon electric contact devices 76 which are intended to lie against associated contact plates 26 of respective conductors 20. The contact plates 26 will thus form one pole and the tool base material the other pole. For this reason, there is provided a further contact plate 29 which has direct electrical contact with the base material 21 of the tool and which is intended to abut a further contact device 79 in the tool holder TH. Naturally, the contact plates 26, 29 are not covered by the electrically insulating protective wear layer.

Electric conductors 80 from the contact devices in the tool holder extend to a signal processor 82. The signal processor itself has no bearing on the invention per se and will there-fore only be described in brief.

The signal processor, which may be of any known kind, such as a purpose programmed computer, is constructed to determine the temperature established by each thermocouple 10-13, with the aid of suitable software. The processor is also programmed to calculate the distribution of temperature in the tool, at least at the cutting edge of the tool and/or at the near vicinity of the edge.

The processor is also constructed to detect and register abrupt changes in voltage from the thermocouples. For example, when wear on the tool is such that the chamfer wear face has been worn down to the A—A in FIG. 2, the thermocouples 10 and 11 will have been worn away in the process. The wearing away or obliteration of a thermocouple is registered as an abrupt change in the voltage associated with the thermocouple. In this way, the processor will obtain information relating to the temperature prevailing at different points on the cutting tool, the rate at which the tool is being worn and the extent of such wear. The wear rate can be calculated by registering when successive thermocouples are worn away.

Although the number of thermocouples provided can vary, it is believed that from three to five thermocouples on the clearance or relief surface of the tool will suffice for the majority of applications.

Naturally, at least one thermocouple can be arranged in a similar fashion on the rake face 8 (see FIGS. 1 and 2) of the tool, at or adjacent the region where chip breaking takes place.

When the cutting tool concerned has two, three, four, six or eight cutting edges, the tool will be provided with thermocouples in accordance with the aforegoing at each edge, in the same manner as that described above for an edge 3.

In the aforegoing there has been described an embodiment in which a conductor at one point forms a thermocouple with the base material of the cutting tool.

Second Embodiment

FIGS. 5 and 6 illustrate another embodiment in which each temperature sensor comprises a point at which two electrical conductors of mutually dissimilar materials and applied to the surface of the cutting tool are connected together to form a thermocouple. The first of these materials is designated 30-33 and the second is designated 34. The thermocouple is designated 35-38. The two materials may, for instance, be Pt and Pt/Rh or NiCr and NiAl. Extending from each thermocouple is a conductor which leads to previously described contact plates 39, 40 corresponding to the contact plates 26, 29 in FIG. 3.

As will be understood, it is also necessary with this second embodiment to coat the base material 21 of the tool with an electrically insulating protective layer 22 when the base material is electrically conductive. The conductors are also preferably provided with a protective wear layer 25. FIG. 6 is a sectional view of a thermocouple configured in accordance with the second embodiment.

Third Embodiment

FIG. 7 illustrates a third embodiment in which each temperature sensor comprises a conductor 50-53 made of a material whose resistance changes with temperature. The conductors 50-53 are also so placed as to be worn away sequentially as the tool is worn in use. The conductors may, for instance, be made of Ni or Pt. According to one preferred variant, the conductors 50-53 are placed parallel with and spaced from one another and at mutually different distances from the cutting edge on the chip breaking side of the cutting tool. The conductors 50-53 are electrically connected in parallel to electrical conductors 54-55 whose respective resistances are not changed appreciably with changes in temperature, these last mentioned conductors 54, 55 extending from the ends of the mutually parallel conductors to contact plates 56, 57 which correspond to the earlier mentioned contact plates 26, 29 and 39, 40.

The conductors 50-55 are placed on an insulating layer on the base material 21, when the base material is electrically conductive. The conductors are also conveniently coated with a protective wear layer 25.

FIG. 8 illustrates the chamfer wear surface of a triangular indexable cutting insert 60. In the case of this embodiment, three thermocouples 61-63 are mounted in accordance with the technique described above with reference to FIGS. 2 and 4. Conductors 64-66 extend from the thermocouples 61-63 to contact plates 67-69. The contact plate corresponding to the contact plate 29 of the FIG. 2 embodiment, i.e. the direct contact to the base material is judiciously located in the centre hole 70 of the insert 60.

It will be obvious that the present invention enables an effective and adaptive control to be achieved, as mentioned in the aforegoing.

It will also be evident that the sensors can be positioned differently and in different patterns than exemplified above. The contact plates may also be placed at other locations.

The invention is therefore not limited to the above exemplifying embodiments, since modifications and variations can be made within the scope of the following claims.

We claim:

1. A cutting tool having at least one cutting edge (3), a rake face (8) and a clearance surface (28) adjacent and associated with each said at least one cutting edge, said tool being equipped with a tool state indicator which comprises temperature sensors and electrical conductors applied to said tool, and wherein two or more said temperature sensors (10-13; 35-38; 50-53; 62-64) are placed on the clearance surface (28) of the tool (1) at mutually different distances from said tool cutting edge (3), so that the temperature distribution in the tool (1), at least at said cutting edge (3) thereof and in the immediate vicinity of said cutting edge, can be calculated from electric signals transmitted by said temperature sensors (10-13; 35-38; 50-53; 62-64); and in that at least some of said temperature sensors on the clearance surface of said tool are so placed that one or more of the sensors on said clearance surface will be worn away in a successive order as the cutting edge and adjacent clearance surface of the tool (1) wears.

2. A tool according to claim 1, wherein each said temperature sensor (10-13; 35-38) is a thermoelement.

3. A tool according to claim 1 wherein said tool (1) is made of an electrically conductive hardmetal material, said tool (1) is covered with an electrically insulating layer (22) at least on said clearance surface and said electrical conductors are mounted on top of said layer.

4. A tool according to claim 2, wherein each temperature sensor (35-38) consists of a point at which two electrical conductors (34; 30-33) placed on the tool and made of mutually different materials are connected together and form a thermocouple.

5. A tool according to claim 2, in which said tool (1) is made of an electrically conductive metal base material and is provided with an electrically insulating material layer (22) at least on the clearance surface of said tool, and wherein one of said conductors (20) is placed on said insulating layer (22) for each said temperature sensor (10-13; 62-64); and in that said insulating layer (22) has formed therein a hole (23) in which one end (24) of each of said conductors (20) is brought into contact with said base material (21) such as to form a thermocouple together with said base material (21) of the tool (1) and said thermocouple is said temperature sensor.

6. A tool according to claim 1, wherein contact plates (26, 29, 39; 40; 67-70) are provided on the tool and insulated from the tool, and each said temperature sensor (10-13; 35-38; 62-64) is connected electrically to an associated one of said contact plates on the tool (1), and said contact plates are adapted to co-act with contact devices for the transmission of electric signals from the tool (1) to a signal processor.

7. A tool according to claim 1, wherein each said temperature sensor includes a temperature responsive conductor (50-53) which is made of a material whose electrical resistance changes with temperature.

8. A tool according to claim 7, wherein said temperature responsive conductors (50-53) are placed in mutually parallel spaced apart relationship; and in that said temperature responsive conductors are connected electrically in parallel to said electrical conductors (54, 55) which extend from said parallel temperature responsive conductors to contact plates (56, 57) on the tool, said contact plates (56, 57) being adapted to co-act with contact devices for the transmission of electric signals from the temperature sensors on the tool (1) to a signal processor.

9. A tool according to claim 1, wherein at least one temperature sensor is placed on the rake face (8) of the tool.

* * * * *

UNITED STATES PATENT AND TRADEMARK OFFICE
CERTIFICATE OF CORRECTION

PATENT NO. : 5,176,053

DATED : January 5, 1993

INVENTOR(S) : BIRGER ALVELID et al.

It is certified that error appears in the above-identified patent and that said Letters Patent is hereby corrected as shown below:

Column 2, line 1, after "filed" insert --April 28, 1989, as a continuation of U.S. Application Serial No.--.

Column 3, line 31, "allows" should be --alloys--.

Signed and Sealed this

Twenty-sixth Day of October, 1993

*Attest:*

BRUCE LEHMAN

*Attesting Officer*       *Commissioner of Patents and Trademarks*